April 7, 1942.  J. L. GRAVES  2,278,440
MEASURING INSTRUMENT
Filed Aug. 30, 1940
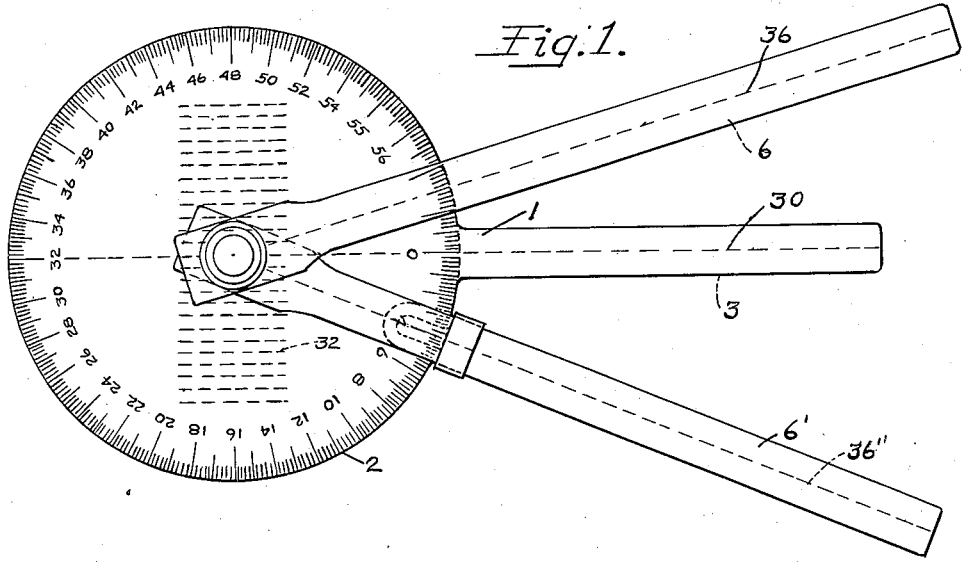
Fig. 1.
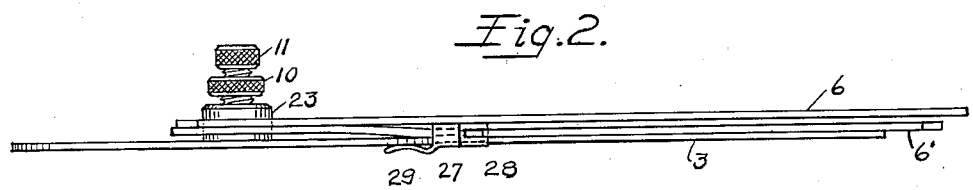
Fig. 2.
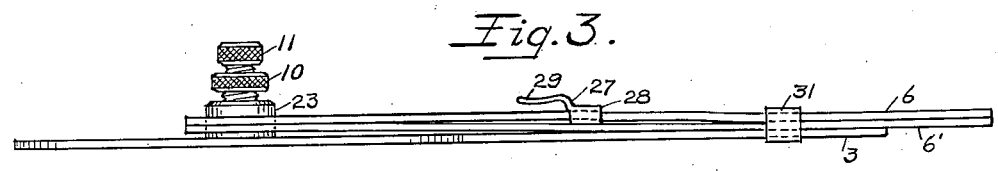
Fig. 3.
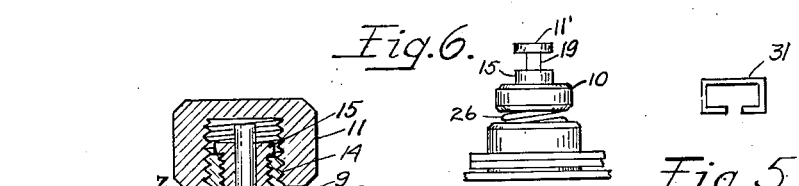
Fig. 6. Fig. 5. Fig. 4.
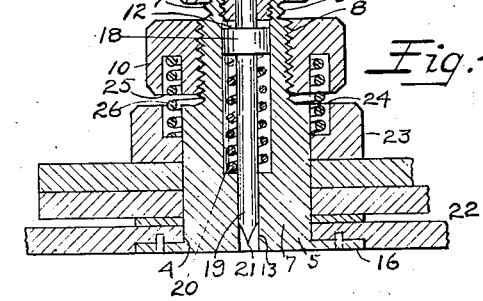
Inventor
John L. Graves
By Francis F. Vanderworker
Attorney Patented Apr. 7, 1942

2,278,440

UNITED STATES PATENT OFFICE 2,278,440

MEASURING INSTRUMENT

John L. Graves, Pacific Grove, Calif.

Application August 30, 1940, Serial No. 354,864

1 Claim. (Cl. 33—75)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to measuring devices, but more particularly to an instrument of the protractor type which is designed to facilitate the procurement of topographical measurements.

One object of the invention is to provide an instrument which may be easily oriented with respect to the grid lines on cross-sectioned paper, maps or charts without the necessity of drawing one or more lines parallel to those of the grid.

Another object of the invention is to construct an instrument provided with a plunger operated center punch which is adapted to penetrate and thus mark a center point on a map or chart, or to maintain the center of the instrument at a point when making angular measurements.

Another object of the invention is to provide an instrument of the protractor type which may be easily and quickly operated with a high degree of accuracy.

Still another object of the invention is to provide an instrument in the operation of which it is unnecessary to deface the map or chart which is being used for measuring purposes with a number of indicating or marker lines.

With these and other objects in view this invention consists in certain novel details of construction, combination and arrangement of parts to be more fully hereinafter described and claimed.

Referring more particularly to the accompanying drawing in which corresponding parts are indicated by similar reference characters:

Fig. 1 is a top plan view of the protractor with the upper and lower movable arms extending on either side of the dial arm, the upper arm being fixed to the disc by the dial clamp;

Fig. 2 is a side elevation of the protractor, as shown in Fig. 1;

Fig. 3 is a side elevation of the protractor with movable arms retained in closed position by the arm clamp;

Fig. 4 is an enlarged sectionized view of the pivot assembly taken on the line 4—4 of Fig. 1;

Fig. 5 is an end elevation of the arm clamp shown in Fig. 3; and

Fig. 6 is an elevation of the pivot assembly showing a modified form of depressible pin member.

Referring to the figures, the numeral 1 designates the base of the instrument, which is formed of plastacele or any other suitable transparent material. The base comprises a circular disc-shaped dial portion 2 preferably graduated in mils as shown, and formed integral with a dial arm 3.

The dial portion 2 is provided with a centrally drilled countersunk opening 4 adapted to receive a pivot assembly 5 which is rigidly attached to this portion of the base to serve as an axis about which upper and lower dial arms 6 and 6' may be rotatably adjusted. These dial arms are formed of a similar material as the base.

The pivot assembly 5 comprises a centrally drilled circular shaft 7, which is provided with externally threaded portions 8 and 9 for the reception of an adjusting nut 10 and a plunger cap 11. The central passage in shaft 5 is comprised of an upper and a lower portion which are drilled respectively to a larger and a smaller diameter as designated by the numerals 12 and 13. The upper portion 12 of this passage is threaded at 14 for the reception of a centrally drilled nipple or plug 15. The bottom of the shaft 7 is provided with a flange 16 by which fits into a countersunk portion of the dial member adjacent the centrally drilled opening 13, and is attached to the dial member 2 by screws 17.

A piston 18 is attached to a spindle or pin member 19 forming a plunger member, the lower portion of which is slidably mounted within the centrally drilled portion 13 of the pivot shaft 7. The upper portion of the slidable rod fits within the central opening drilled in the plug 15. Between the internal diameter of the passage 12 and the external diameter of the rod 19 is located a coil expansion spring 20 which exerts pressure against the piston 18 and the floor of the central opening 12 to retain the spindle 19 in raised position.

The spindle member 19 is pointed at its lower extremity as indicated by the numeral 21. This point is adapted to penetrate the paper or base upon which the protractor is placed when the cap 11 is screwed down upon the upwardly extending end of the spindle. In the modified form shown in Fig. 6 the upper external threads 9 and the threaded cap 11 is eliminated and the pin is lowered by depressing the cap 11', which is at the upper extremity of the spindle 19.

The shaft 7 (Fig. 4) is fitted with a washer 22 which is located upon the upper surface of the dial portion of the base and beneath the lower surface of the lower arm 6'. The upper and lower arms are rotatably mounted on the shaft 7 beneath a collar 23 which is slidably fitted thereon, and a nut 10 which engages the externally threaded portion 8 of said shaft. The collar 23 and the nut 10 are provided with annular grooves, designated by the numerals 24 and 25 respectively, which are opposite each other and which are adapted to retain the opposite ends of a coil spring 26 interposed between them, so that tightening or screwing the nut 10 downward on the shaft 7, increases the degree of pressure exerted by the collar 23 upon the arms 6 and 6' and thus regulates their resistance to rotary movement.

A dial clamp 27 which fits any of the arms is provided. This clamp is comprised of a band 28, which slidably fits on an arm, and a resilient clamping member 29 formed integral therewith. The clamp is used to hold a rotatable arm in contact with the dial. When in operation the dial clamp is slipped onto a rotatable arm and pushed centrally thereon until the resilient clamping member engages the lower surface of the dial, as shown in Fig. 2. When not in use the dial clamp is slipped onto the upper arm with its clamping member above the upper surface of said arm.

An arm clamp 31 is also provided, as illustrated in Figs. 3 and 5. This clamp consists of a strip of metal which extends around the edges of the arms to hold them together. It may be made as a solid band, or a band having a rectangular shape with a split in one of its sides, as shown in Fig. 5.

The arms are marked on their lower surface with central lines 30, 36 and 36'. That of the dial arm extends radially from the zero mark of the dial and is used to indicate this marking along its extent. The central lines on the other arms are used to indicate angular measurements with respect to the circular graduations on the dial as shown in Fig. 1.

The lower surface of the dial portion of the protractor is marked with a multiplicity of equally spaced parallel lines indicated by the numeral 32, which are perpendicular to the central axis of the dial passing through the zero mark. These lines are adapted to facilitate parallel movement of the dial with respect to coordinates on cross section paper, or to more easily note the distance moved from any line or location mark.

In the operation of the device the center lines of the arms are placed either to coincide with lines on a drawing, such as a map, or to overlie marks indicating the location of objects. The angular divergence of these center lines as indicated on the dial gives the relative location of these marks or lines with respect to each other and also with respect to the center of the dial which may be indicated on the drawing by depressing the pointed spindle.

Parallel movement of the center point of the dial, is easily effected through use of the parallel lines which extend across the dial. Parallel movement of the center point of the dial with respect to either the ordinates of abscissae on cross section paper or with respect to any line or marker points may be accomplished easily with their aid. They also serve to facilitate measurement of the distance of the center point from grid lines on maps, charts, or on cross section paper.

A multiplicity of topographical problems may be solved with the aid of this instrument, several of which, are cited below to show the facility with which it may be used:

*Problem.*—Y azimuth of church is 5600 mils; Y azimuth of bench mark is 480 mils; to find location of operator on map.

*Procedure.*—Reverse dial clamp 27 on uppermost arm so resilient clamping member 29 is below and toward center of protractor dial, with uppermost arm 6 set off 5600 m. Engage clamping member 29 below protractor circle or dial.

With movable lower arm 6' set off 480 m. Put protractor on map, move it about until center line 36 of uppermost arm 6 is in coincidence with conventional sign for church and lower arm 6' is in coincidence with conventional sign for bench mark, and center parallel lines 32 are in coincidence with or parallel to any Y line on map. Press or screw plunger cap until point of spindle penetrates map. Pin hole is location of operator on map.

Another problem to illustrate the various uses of the instrument is as follows:

Given: Well defined features, road, railroad or the like, designated A somewhere along which operator's position is known to be, and B, a point located on the ground and appearing on the map.

To find the location of the operator (P):

*Procedure.*—Read angle from road (A) to church (B).

This angle equals 1320 mils.

Set off 1320 m. on protractor.

Slide zero or dial arm 3 along road A until centerline 30 of arm (measuring angle) coincides with B.

Depress plunger. Pin hole in map indicates operator's position (P).

The instrument may be used to effect unnumerable measuring operations in topographical work, such as in surveying, and is also useful for the determination of azimuth and angles on aerial photographs, where its simplicity of manipulation facilitates the ease with which these operations may be effected.

Having described my invention, what I claim as new and wish to secure by Letters Patent is:

A measuring device consisting of a transparent base composed of a dial member formed integral with a projecting arm, a cylindrical pivot member provided with external and internal threads attached centrally to said dial, a plunger comprising a piston and pin member slidably fitted within said pivot member, a centrally drilled plug threadably engaged within said pivot member and adapted to retain said plunger therein, a spring for retaining said pin in a raised position, a cap threadably engaging said pivot member and adapted to depress said pin, transparent measuring arms rotatably mounted on said pivot member, a friction collar slidably mounted on said pivot member, an adjusting nut threadably engaging said pivot member, and a coil spring interposed between said collar and said adjusting nut adapted to effect restraint of rotational movement of said arms by the adjustment of said nut, and means for clamping one of said arms to said dial member.

JOHN L. GRAVES.